(12) United States Patent
Oblinger (10) Patent No.: US 6,785,676 B2
(45) Date of Patent: Aug. 31, 2004

(54) CUSTOMER SELF SERVICE SUBSYSTEM FOR RESPONSE SET ORDERING AND ANNOTATION

(75) Inventor: Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/778,139

(22) Filed: Feb. 7, 2001

(65) Prior Publication Data

US 2002/0105532 A1 Aug. 8, 2002

(51) Int. Cl.[7] .......................... G06F 17/30; G06F 17/00
(52) U.S. Cl. ............................... 707/5; 707/4; 715/512
(58) Field of Search ..................... 707/1–8, 101–102, 707/104.1; 345/700–702, 748, 744, 707–708; 715/512

(56) References Cited

U.S. PATENT DOCUMENTS

| | | |
|---|---|---|
| 5,303,361 A | 4/1994 | Colwell et al. |
| 5,321,833 A | 6/1994 | Chang et al. |
| 5,375,244 A | 12/1994 | McNair |
| 5,446,891 A | 8/1995 | Kaplan et al. |
| 5,524,187 A | 6/1996 | Feiner et al. |
| 5,546,516 A | 8/1996 | Austel et al. |
| 5,600,835 A | 2/1997 | Garland et al. |
| 5,608,899 A | 3/1997 | Li et al. |
| 5,619,709 A | 4/1997 | Caid et al. |
| 5,710,899 A | 1/1998 | Eick |
| 5,724,567 A | 3/1998 | Rose et al. |
| 5,754,939 A | 5/1998 | Herz et al. |
| 5,768,578 A | 6/1998 | Kirk et al. |
| 5,787,422 A | 7/1998 | Tukey et al. |
| 5,794,178 A | 8/1998 | Caid et al. |

(List continued on next page.)

OTHER PUBLICATIONS

"The Answer Machine" (Information Services Management) (Industry Trend or Event), by Susan Feldman, Jan. 2000, The Magazine for Database Professionals, 41 pages.

(List continued on next page.)

Primary Examiner—Alford Kindred
(74) Attorney, Agent, or Firm—Scully, Scott, Murphy & Presser; Daniel P. Morris, Esq.

(57) ABSTRACT

A system and method for annotating resource results obtained in a customer self service system that performs resource search and selection. The method comprising the steps of: receiving a resource response set of results obtained in response to a current user query and receiving a user context vector associated with the current user query, the user context vector comprising data associating an interaction state with the user; applying an ordering and annotation function for mapping the user context vector with the resource response set to generate an annotated response set having one or more annotations; and, controlling the presentation of the resource response set to the user according to the annotations, wherein the ordering and annotation function is executed interactively at the time of each user query. In an off-line process, a supervised learning algorithm is implemented for receiving user interaction data from among a database of user interaction records and an annotation scoring metric representing a measure of performance in locating resource response results displayed via a graphical interface. The algorithm generates ordering and annotation functions which are adaptable based on history of user interactions as provided in the database of user interaction records. The result of this invention is the ability to drive visualization systems for presenting resource response results in the most beneficial and meaningful way to the user via an interface when performing search and resource selection. The system and method is especially applicable for a self service system in a variety of customer self service domains including education, real estate and travel.

28 Claims, 7 Drawing Sheets

U.S. PATENT DOCUMENTS

| | | | |
|---|---|---|---|
| 5,802,515 | A | 9/1998 | Adar et al. |
| 5,826,260 | A | 10/1998 | Byrd, Jr. et al. |
| 5,841,437 | A | 11/1998 | Fishkin et al. |
| 5,850,531 | A | 12/1998 | Cox et al. |
| 5,918,217 | A | 6/1999 | Maggioncalda et al. |
| 5,930,501 | A | 7/1999 | Neil |
| 5,956,707 | A | 9/1999 | Chu |
| 5,974,412 | A | 10/1999 | Hazlehurst et al. |
| 5,999,927 | A | 12/1999 | Tukey et al. |
| 6,006,221 | A | 12/1999 | Liddy et al. |
| 6,009,422 | A | 12/1999 | Ciccarelli |
| 6,012,053 | A | 1/2000 | Pant et al. |
| 6,012,067 | A | 1/2000 | Sarkar |
| 6,014,661 | A | 1/2000 | Ahlberg et al. |
| 6,097,386 | A | 8/2000 | Bardon et al. |
| 6,105,023 | A | 8/2000 | Callan |
| 6,134,541 | A | 10/2000 | Castelli et al. |
| 6,173,287 | B1 * | 1/2001 | Eberman et al. ............ 707/102 |
| 6,226,408 | B1 | 5/2001 | Sirosh |
| 6,256,633 | B1 | 7/2001 | Dharap |
| 6,282,540 | B1 | 8/2001 | Goldensher et al. |
| 6,327,590 | B1 | 12/2001 | Chidlovskii et al. |
| 6,347,313 | B1 | 2/2002 | Ma et al. |
| 6,490,577 | B1 | 12/2002 | Anwar |
| 6,502,091 | B1 | 12/2002 | Chundi et al. |
| 6,513,031 | B1 | 1/2003 | Fries et al. |
| 6,519,586 | B2 | 2/2003 | Anick et al. |
| 6,578,037 | B1 | 6/2003 | Wong et al. |
| 2001/0051958 | A1 * | 12/2001 | deVries et al. .............. 707/511 |
| 2002/0129015 | A1 | 9/2002 | Caudill et al. |
| 2003/0018632 | A1 * | 1/2003 | Bays et al. .................... 707/3 |

OTHER PUBLICATIONS

Billsus, D., et al., "A learning agent for wireless news access," Proceedings of IUI 2000: International Conference on Intelligent User Interfaces, ACM, Jan. 9–12, 2000, pp. 33–36, XP–002205011.

Olsen, K., et al., "Visualization of a Document Collection: The Vibe System", Information Processing & Management, Elsevier, Barking, GB, vol. 29, No. 1, 1993, pp. 69–81, XP 000574984.

Mladenic, D, "Text–learning and related intelligent agents: a survey", IEEE Intelligent Systems, IEEE, vol. 14, No. 4, Jul. 1999, pp. 44–54, XP–002205012.

Göker, A., "Capturing Information Need by Learning User Context", 16th International Joint Conferent in Artificial Intelligence: Learning About User Workshop, Jul. 31, 1999, pp. 21–27, XP–002205013.

Anonymous, "Taxonomized Web Search", IBM Technical Disclosure Bulletin, IBM Corp. New York, US, vol. 40, No. 5, May 1, 1997, pp. 195–196, XP–002133594.

Davies, J., et al., "Knowledge Discovery and Delivery", British Telecommunications Engineering, London, GB, vol. 17, No. 1, Apr. 1, 1998, pp. 25–35, XP–000765546.

* cited by examiner

| | EDUCATION (EX: ENVIRONMENT) ⌐60 | EDUCATION (EX: SUBJECT MATTER) ⌐70 | REAL ESTATE ⌐80 | TRAVEL ⌐90 |
|---|---|---|---|---|
| USER QUERY | LEARN LOTUS NOTES AT HOME<br><br>61 | BECOME A LINUX DEVELOPER BY JUNE<br><br>71 | FIND HOUSING NEAR NEW JOB BY AUGUST<br><br>81 | PLAN A TRIP TO VERMONT IN JUNE<br><br>91 |
| USER CONTEXT | CORP EXEC AT HQ<br>REMOTE STAFFIE<br>COMMUTING TECHIE<br>TRAVELING CONSULTANT<br>62 | CORP EXEC AT HQ<br>REMOTE STAFFIE<br>COMMUTING TECHIE<br>TRAVELING CONSULTANT<br>72 | RELOCATING BUSINESS PROFESSIONAL<br>EMPTY NESTER<br>COLLEGE STUDENT<br><br>82 | SINGLE MOM W/KIDS<br>SWINGING SINGLES<br>BUSINESS TRAVELER<br><br>92 |
| CONTEXT ATTRIBUTE | CONNECTIVITY<br>LEARNING MODE(S)<br>TECHNICAL FIELD<br><br>63 | CONNECTIVITY<br>LEARNING MODE(S)<br>TECHNICAL FIELD<br><br>73 | MODE OF COMMUTE TO WORK/SCHOOL<br>MODE OF HOUSING<br>MAINTENANCE STYLE<br>83 | MODE OF TRANSPORTATION<br>MODE OF HOUSING<br>FOOD STYLE<br><br>93 |
| ATTRIBUTE VALUE | LAN CONNECTED<br>DIAL UP<br>DSL<br>DISCONNECTED<br><br>64 | SECURITY<br>GRAPHICAL INTERFACES<br>PROGRAMMING<br>SYSTEMS INTEGRATION<br><br>74 | CAREFREE LIVING<br>SUBCONTRACT IT ALL<br>DO-IT-YOURSELF-ER<br><br><br>84 | DRIVE<br>FLY<br>TRAIN<br><br><br>94 |
| VALUE RESOURCE PARAMETERS | INCLUDE: DOWNLOAD & PLAY RESOURCES<br>-----------------<br>EXCLUDE: ON LINE COLLABORATIVE RESOURCES<br><br><br>65 | INCLUDE KDE<br>-----------------<br>EXCLUDE GNOME<br><br><br><br><br>75 | INCLUDE WALLS<br>INCLUDE PAINT<br>INCLUDE LAWN MOWING<br>-----------------<br>EXCLUDE PLUMBING<br>EXCLUDE ELECTRICAL<br>EXCLUDE LANDSCAPING<br>85 | INCLUDE ALL MAJOR CARRIERS<br>-----------------<br>EXCLUDE PROP PLANES<br>EXCLUDE BAD SAFETY RECORDS<br><br><br>95 |
| RESOURCE SELECTION CRITERIA & VALUES | COST<br>TIME<br>QUALITY<br>RISK<br>66 | COST<br>TIME<br>QUALITY<br>RISK<br>76 | COST<br>TIME<br>QUALITY<br>RISK<br>86 | COST<br>TIME<br>QUALITY<br>RISK<br>96 |

CUSTOMER SELF SERVICE SUBSYSTEM FOR RESPONSE SET ORDERING AND ANNOTATION

BACKGROUND OF THE INVENTION

1. Field of the Invention

This invention relates generally to the field of customer self service systems for resource search and selection, and more specifically, to a novel mechanism for annotating response sets via an adaptive algorithm, wherein the annotations supplied are used to drive any visualization system that presents resource response results.

2. Discussion of the Prior Art

Currently there exist many systems designed to perform search and retrieval functions. These systems may be classified variously as knowledge management systems, information portals, search engines, data miners, etc. However, providing effective customer self service systems for resource search and selection presents several significant challenges. The first challenge for current systems with query capability is that serving queries intelligently requires a large amount of user supplied contextual information, while at the same time the user has limited time, patience, ability and interest to provide it. The second challenge is that searching without sufficient context results in a very inefficient search (both user time and system resource intensive) with frequently disappointing results (overwhelming amount of information, high percentage of irrelevant information). The third challenge is that much of a user's actual use and satisfaction with search results differ from that defined at the start of the search: either because the users behave contrary to their own specifications, or because there are other contextual issues at play that have not been defined into the search. The prior art has addressed the use of some of the features of the resources (content and other) in relation to the user's context and/or prior use of other resource search and selection systems, for selection of responses to current user's queries. Representative prior art approaches systems described in U.S. Pat. No. 5,724,567 entitled "System for Directing Relevance-Ranked Data Objects to Computer Users"; U.S. Pat. No. 5,754,939 entitled "System for Generation of User Profiles For a System For Customized Electronic Identification of Desirable Objects"; and, U.S. Pat. No. 5,321,833 entitled "Adaptive Ranking System for Information Retrieval".

U.S. Pat. No. 5,321,833 describes an adaptive record ranking method for full text information retrieval, which quantifies the relevance of retrieved records to query terms occurring in the record. The method utilizes a multilevel weighting technique which permits user input to affect record weighting at each level of the ranking process. The method utilizes weighted attributes of properties of terms occurring in the records of a database and compensates for the distance between adjacent words of complex terms. The method has been implemented on large full text databases and the resulting rankings achieve a relatively high level of precision in ranking the relevance of retrieved records to a user query. However, this method does not take into account user context data, and thus is not specialized based on a user situation within the whole system.

U.S. Pat. No. 5,724,567 describes an information access system that stores items of information in an unstructured global database. When a user requests access to the system, the system delivers to that user an identification of only those items of information which are believed to be relevant to the user's interest. The determination as to the items of information that are relevant to a user is carried out by ranking each available item in accordance with any one or more techniques. In one approach, the content of each document is matched with an adaptive profile of a user's interest. In another approach, a feedback mechanism is provided to allow users to indicate their degree of interest in each item of information. These indications are used to determine whether other users, who have similar or dissimilar interests, will find a particular item to be relevant.

For instance, U.S. Pat. No. 5,754,939 describes a method for customized electronic identification of desirable objects, such as news articles, in an electronic media environment, and in particular to a system that automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media.

A major limitation of these prior art approaches, however, is the absence of a mechanism for implementing user context in informing the ranking of the resources. Moreover, these prior art approaches are limited in that they do not enable user tutoring of the application for ranking information. That is, prior art approaches do not provide for the adaptation or changing the ranking over time, for example, based on a history of user interactions with the system. Another major limitation of the prior art is that these systems do not annotate the response sets via an adaptive algorithm and moreover, do not use the resulting annotations to drive visualization systems.

It would be highly desirable to provide for a customer self service system, a mechanism that annotates query response sets via an adaptive algorithm and wherein the annotations the mechanism supplies may be used to drive any visualization system.

SUMMARY OF THE INVENTION

It is an object of the present invention to provide for a customer self service system for resource search and selection a mechanism for supplying annotations to a set of query response sets via an adaptive algorithm.

It is a further object of the present invention to provide for a customer self service system for resource search and selection an annotation mechanism for annotating query response sets wherein the annotations affect the order that these resources are presented to the user.

It is another object of the present invention to provide for a customer self service system for resource search and selection, an annotation mechanism for annotating query response sets wherein the annotations provided affect the order that these resources are presented to the user and wherein the ordering is based on features of the resource itself when viewed through the user's context.

It is yet another object of the present invention to provide an annotation function for a customer self service system for resource search and selection that implements a supervised learning algorithm wherein training data utilized for this algorithm is derived from prior user interactions and the annotation function is optimized based on an annotation scoring metric.

According to the invention, there is provided a system and method for annotating resource results obtained in a customer self service system that performs resource search and selection. The method comprising the steps of: receiving a resource response set of results obtained in response to a current user query and receiving a user context vector associated with the current user query, the user context vector comprising data associating an interaction state with the user; applying an ordering and annotation function for mapping the user context vector with the resource response set to generate an annotated response set having one or more annotations; and, controlling the presentation of the resources response set to the user according to the annotations, wherein the ordering and annotation function is executed interactively at the time of each user query.

Further, in an off-line process, a supervised learning algorithm is implemented for receiving user interaction data from among a database of user interaction records and an annotation scoring metric representing a measure of performance in locating resource response results displayed via a graphical interface. The algorithm generates ordering and annotation functions which are adaptable based on history of user interactions as provided in the database of user interaction records. The result of this invention is the ability to drive any visualization system for presenting resource response results in the most beneficial and meaningful way to the user via an interface when performing search and resource selection.

Advantageously, such a system and method of the invention is applicable for a customer self service system in a variety of customer self service domains including education, real estate and travel.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENTS

Figure 1:
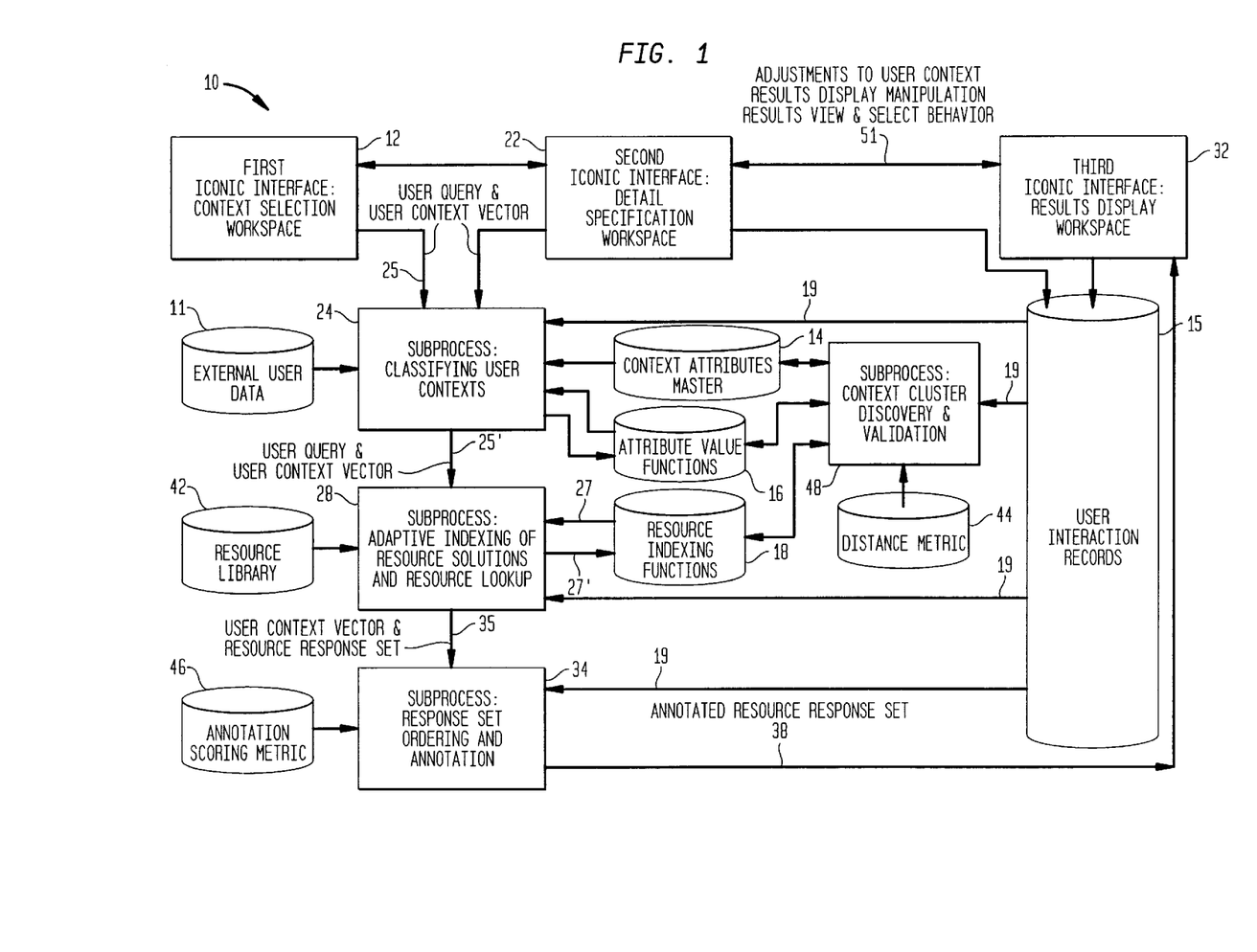
FIG. 1 is a flowchart showing the steps of the control flow between the components comprising the customer self service system according to the invention.

FIG. 1 illustrates a customer self service system ("system") 10 which is described in detail commonly-owned, co-pending U.S. patent application Ser. No. 09/778,146 entitled CUSTOMER SELF SERVICE SYSTEM FOR RESOURCE SEARCH AND SELECTION the contents and disclosure of which are incorporated by reference as if fully set forth herein. The system 10 is a comprehensive self service system providing an end-to-end solution that integrates the user and system, the content and context, and, the search and result so that the system may learn from each and all users and make that learning operationally benefit all users over time. The present invention comprises a particular aspect of this system that focuses on annotating a set of response resources by implementing a supervised training algorithm. Particularly, the present invention is directed to a response set ordering and annotation sub-process that generates annotations that affect, among other things, the order that these resources are presented to the user of the resource search and selection system. The ordering is based on features of the resource itself when viewed through the user's context.

Particularly, as shown in FIG. 1, the self service system provides a three-part intuitive iconic interface comprising interface components 12, 22 and 32 for visualizing and exploring the set of resources that the system has found to match the user's initial query and related subject and context variables. The system 10 preferably enables the expression of a user's context as part of the query and expresses the relevance of the results to a particular user via the interface in terms beyond that of the results' content. The resource set is presented to the user in a way which clearly illustrates their degree of fit with the user's most important context variables, as indicated by their prior usage of the system, as well as by context choices for the current query. The system displays the resources in the sequence specified by the user and enables the user to select and weight the criteria to be used in interpreting and selecting between resources. This provides a shifting of the user's focus from finding something, to making choices among the set of resources available. Via the interface components 12, 22 and 32, the user may redefine their query, preview some or all of the suggested resources or further reduce, and redisplay the response set to extract those with the best degree of fit with that user's current needs. The system generates and displays via the interface a listing of the currently active inclusionary and exclusionary content filters and provides a means for modifying them. More specifically, the intuitive user interface of the invention enables users to specify the variables of their resource needs.

Figure 2:
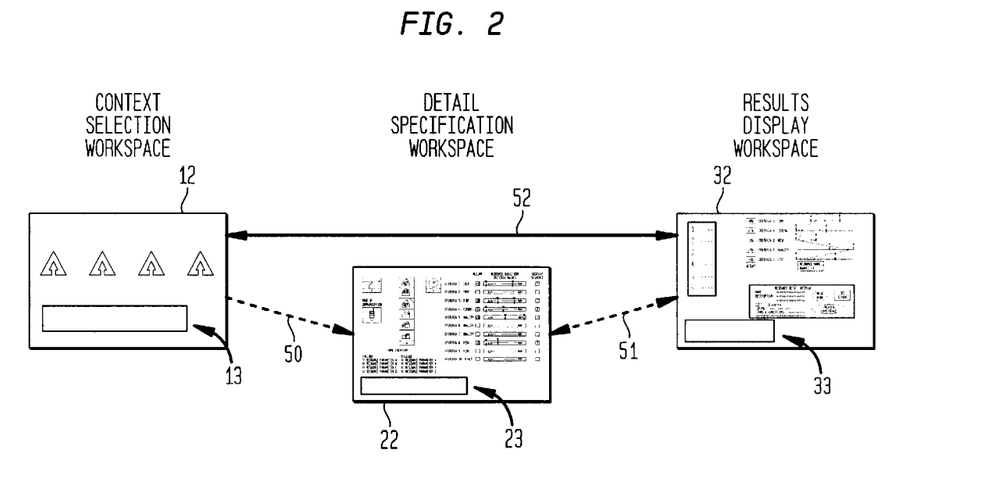
FIG. 2 is a flowchart showing the generic process steps of the user's interaction with the customer self service system through various iconic interfaces.

FIG. 2 particularly depicts reduced-size displays illustrating the three iconic user interfaces 12, 22, 32 which comprise the respective workspaces according to the invention. As will be described in greater detail herein, the first graphical user interface 12 comprises an initial Context Selection Workspace 13 that enables the expression of user context as part of a query in a manner optimized for ease of use; the graphical user interface 22 shown in FIG. 2 provides a Detailed Specification Workspace 23 including a visual representation of multi-dimensional data for expressing query and results that enables users to completely manage their search in a manner optimized for simplicity and clarity of logic; and, the graphical user interface 32 is directed to a Results Display Workspace 33 that enables expression of relevance of results in terms of user context in a manner optimized to facilitate resource selection using user supplied decision criteria. Aspects of interfaces 12, 22 and 32 shown in FIG. 2 are described in greater detail in commonly-owned, co-pending U.S. patent application Ser. No. 09,778, 136 entitled CUSTOMER SELF SERVICE ICONIC INTERFACE FOR PORTAL ENTRY AND SEARCH SPECIFICATION and commonly-owned, co-pending U.S. patent application Ser. No. 09/778,147 entitled CUSTOMER SELF SERVICE ICONIC INTERFACE FOR RESOURCE SEARCH RESULTS DISPLAY AND SELECTION, the contents and disclosure of each of which are incorporated by reference as if fully set forth herein.

Referring back to FIG. 1, there is depicted a conceptual control flow 10 for the customer self service resource search and selection system according to a preferred embodiment. Via the three-part intuitive graphic user interface (GUI) users are enabled to enter queries and manipulate the system's responses according to their resource needs. Behind the scenes, as will be described, is a set of sub-system components that cooperate to derive, assume, sense and infer particular user contexts with minimal user effort.

These components include databases such as: 1) a Context Attributes Master database 14 which stores the definitions of all the attributes known to the system and their relationships to predefined user contexts; 2) an Attribute Value Functions database 16 which stores the definitions and logic associated with assigning a value to an attribute for specific instances (context default, groups of users); 3) a Resource Indexing Functions database 18 which stores the definitions and logic for mapping specific resources to specific context sets; and, 4) a historical User Interaction Records database 15 which stores the users' prior queries, responses, and interactions with the system 10. The first three databases are created before system startup and the User Interaction Records 15 is created with the first user/use of the system, however, it is understood that all four databases are maintained and enhanced through system operations described below.

First, prior to a user signing on to the system, and before the user first views the iconic interface 12, the system 10 performs several pre-processing steps including: 1) creating of an empty "user context vector" 25 and populating the context vector with minimal information from external data elements 11 integrated with the system or, from system sensing/discovery; and, 2) processing the minimal user context vector 25 against the Context Attributes database 14, the Attribute Value Functions database 16, and the User Interaction Records database 15 using context classification logic to result in a "suggestion" that this particular user may be classified into one of a small number of user context definitions from the system's predefined long list of context definitions. After these pre-processing steps, the first iconic interface 12 is then displayed for the user at the user's terminal, or web-browser, in the case of resource searches conducted over a web-based communication link. The iconic Context Selection Workspace 13 initially displays a small set of User Context Icons it has determined are most appropriate, captures the user's selection of the one that seems most fitting for the current user search session, and captures the user's actual query. In most cases, this minimal entry will suffice to begin the search because the system has already determined the relevant attributes, default values and parameters to drive the system forward through the user search without any additional entry on the user's part. However, if the user wishes to review their defaults or to fine tune some context or resource variables, there is an option to proceed to the iconic Detailed Specification Workspace display 22 before starting the search.

Regardless of the screen navigation path chosen, when the user initiates the query, the system 10 packages the user query with a detailed User Context Vector 25 summarizing what is known of the user's needs at this point. Once the search is initiated, the query and context vector are processed sequentially through three distinct sub-processes: 1) the Classifying User Contexts sub-process 24 according to the invention; 2) an Adaptive Indexing of Resource Solutions and Resource Lookup sub-process 28; and, 3) a Response Set Ordering and Annotation sub-process 34 according to the invention.

Particularly, the Classifying User Contexts sub-process 24, receives as input the user query and the raw context vector 25 and External User Data 11, and processes these against the User Interaction records 19 for this user/user group, data from the Context Attributes Master 14 and Attribute Value Functions 16. The system classifies this specified user interaction state and annotates the context vector 25' with a complete set of context parameters for use in subsequent processing. The Classifying User Contexts sub-process 24 particularly applies an inductive learning algorithm as an attempt to predict derived contexts. Additionally, the Classifying User Contexts sub-process 24 updates the Attribute Value Functions database 16 with more enhanced functions. The actual processing via Context Classifier and Context Applier is described in greater detail in commonly-owned, co-pending U.S. patent application Ser. No. 09,778,378 entitled CUSTOMER SELF SERVICE SUBSYSTEM FOR CLASSIFYING USER CONTEXTS, the contents and disclosure of which are incorporated by reference as if fully set forth herein.

As the customer self service system is provided with functionality enabling a user to "bookmark" their stopping point in a prior session and to resume with a "work-in-process" data set, the initial settings may be modified based upon system discovery or user override at the time of inquiry, resulting in the raw contexts associated with the user's current inquiry transaction. It is this raw context data which serves as input to the context classifier sub-process 24.

The Adaptive Indexing of Resource Solutions and Resource Lookup sub-process 28 receives as input the user query and the context vector 25' and processes them against a Resource Library 42, the User Interaction Records for this user/user group 19, and the Resource Indexing Functions 27. This sub-process particularly maps specific contexts to specific resources so as to increase the relevance of search results for a given user in their current context without requiring the user to explicitly train the system. The primary output of the Adaptive Indexing of Resource Solutions and Resource Lookup sub-process 28 is a newly identified Resource Response Set 35 which is input to the Response Set Ordering and Annotation sub-process 34. The Adaptive Indexing of Resource Solutions and Resource Lookup sub-process 28 additionally generates a secondary output which comprises updates to the Resource Indexing Functions database 18 with yet more enhanced functions 27'. Further details regarding the Adaptive Indexing of Resource Solutions and Resource Lookup sub-process 28 may be found in commonly-owned, co-pending U.S. patent application Ser. No. 09,778,135 entitled CUSTOMER SELF SERVICE SUBSYSTEM FOR ADAPTIVE INDEXING OF RESOURCE SOLUTIONS, the contents and disclosure of which are incorporated by reference as if fully set forth herein.

According to the invention, Response Set Ordering and Annotation sub-process 34 receives as input the User Context Vector and Resource Response Set 35 and processes it against data from an Annotation Scoring Metric database 46 and User Interaction Records 19 for the particular user/group. This sub-process 34 weights and ranks the potential responses according to the resource selection criteria specified by the user on the Detailed Specification Workspace described herein, and takes into consideration the scoring metric. The sub-process 34 additionally tags the response set with data elements necessary for display and manipulation on a visualization system, including, but not limited to, the Results Display Workspace 32 described in the co-pending U.S. patent application Ser. No. 09/778,147, and particularly generates as output an Annotated Resource Response Set 38.

Figure 6:
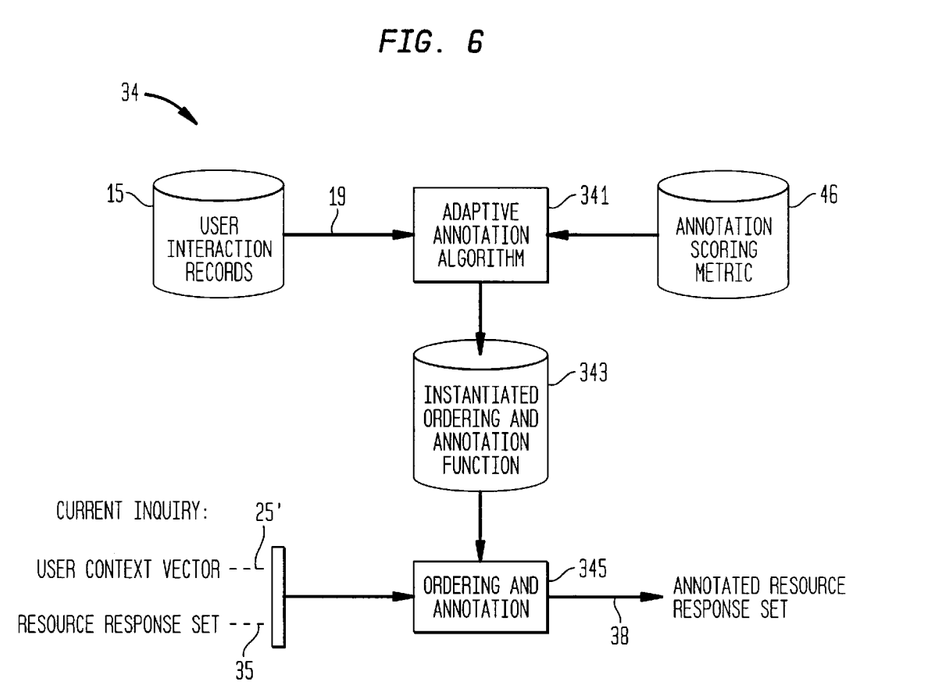
FIG. 6 is a flowchart depicting the methodology for adaptive response ordering and annotation according to the preferred embodiment of the invention.

More particularly, FIG. 6 is a flowchart depicting the response ordering and annotation sub-process methodology 34 for ordering a result set according to the preferred embodiment of the invention. As shown in FIG. 6, the User Interaction Records 19 (which include the actual resources selected by the users and the annotation schemes used to present them) and the Annotation Scoring Metric 46 are input to an Adaptive Annotation Algorithm 341 which is a supervised learning algorithm that generates functions for optimally annotating the response set for ease of use as defined by the Annotation Scoring Metric. For the purpose of this invention the terms rule and function are used interchangeably. Both refer to any data structure that can be executed by an interpreter in a way as to compute a set of labeled output values given a set of labeled input values. An example of an arithmetic rule is "Fahrenheit<−Centigrade*5/9+32". Rule languages include but are not limited to: neural nets, decision trees, functional languages, polynomial functions. User Interaction Records 15 particularly comprises traces of previous interactions with users of the system including: all types of raw context information that were available during those interactions, whether it be static, historical, or transient, organizational or community context, environment context, or any other context associated with the user and dependent upon that user's interaction state and query domain, e.g., education, real estate, travel, etc. user queries, the system's responses, and, in addition, user feedback generated by the user regarding the resources that were provided during those sessions. User feedback, for example, may include a specification of which resource was chosen by the user given a list of displayed resources. The Annotation Scoring Metric 46, for example, may include a parameter representing the measure of "goodness" in terms of how easily the user may find the resources in the response set 35. As another example, the Annotation Scoring Metric 46 may be set up to penalize an annotation which does not make it "easy" for the user to find the resources in the response set, i.e., a metric that places most of the resources ultimately selected by the user on a second screen on the user interface or at the bottom of the first screen. As another example, one measure of performance is closeness of the selected items to the top of the response set (assuming that the annotations of the response set specify an ordering of the response set).

Each of the user interaction records and annotation metric serves as a training set for learning an ordering and annotation function 343. That is, the adaptive annotation algorithm 341 is implemented to optimize the annotation function 343 as measured by the feedback in the received interaction records 19. That is, the annotation function 343 accepts an annotated list of resources, along with the user interaction records associated with the interactions that happened when this annotated list was presented to the user and returns a real value representing the performance of that annotation. For example, an annotation evaluation metric of a score computed by counting how far down from the top of the list was the user's selection given the annotation. Thus, according to this metric, a given annotation set would get the highest possible score if it had placed the resource eventually selected by the user at the top of the list of resources presented to the user. It should be understood that this adaptive process 341 need not be interactive, but may be performed in batch or off-line.

The sub-process methodology 34 further includes an ordering annotation step 345, during which the ordering and annotation function 343 which comprises the functions to be used in mapping the user context vector 25' with the resource response set 35 in order to generate an annotated response set 38. It is understood that the ordering and Annotation step 345 is executed interactively, e.g., at the time of every user query. It is the application of the ordering and annotation function 343 to the user context 25' and resource response set 35 that result in the annotations 38 for the responses in the input response set, which annotations control the presentation of the resources to the user. As an example, these annotations may include ordering, which resources to bold, which would be placed on the primary screen of query results seen by the user and which would be placed on a secondary screen requiring an additional step by the user such as clicking on a button "give me additional resources", which resources to gray out, etc.

As mentioned, the ordered and annotated set of resources that the system has found to best match the user's initial query and related subject and context variables may be displayed through any visualization system, including, but not limited to, the intuitive iconic interface 32 for visualizing and exploring the response set. In that case, the annotations 38 specifically are used to inform the iconic user interface 32 (FIG. 7) what resources to display in response to the query and how to display them.

Figure 7:
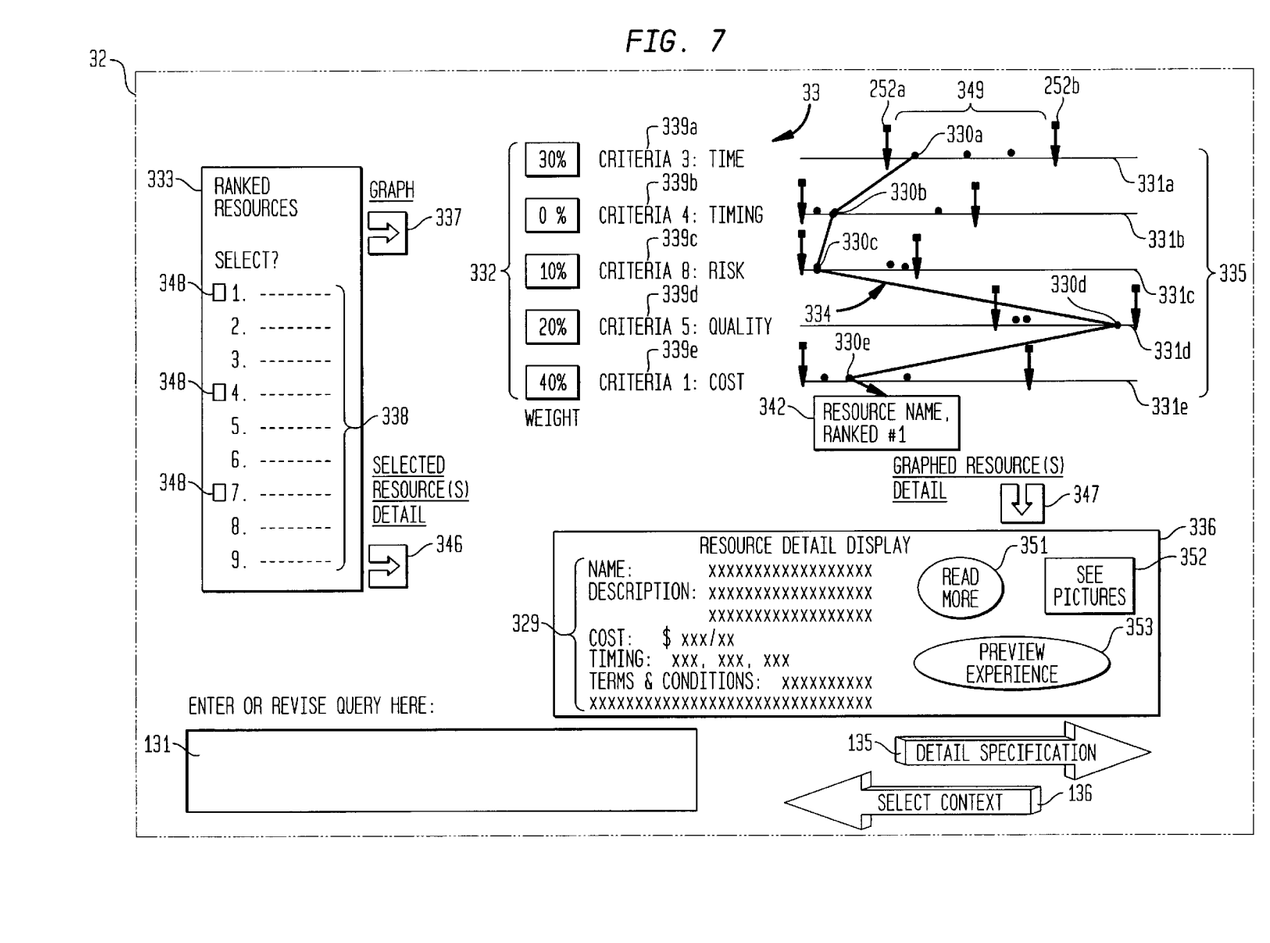
FIG. 7 illustrates in detail the third iconic graphical user interface 32 including the Results Display Workspace 33 that enables the user to visualize and explore the response set that the system has found to best match the user's initial query and related subject and context variables.

FIG. 7 illustrates in detail the third iconic graphical user interface 32 described in greater detail in commonly-owned, co-pending U.S. patent application Ser. No. 09/778,147. As shown in FIG. 7, the graphical user interface 32 is divided into the following sections: a section for displaying the Query Entry field 131 as entered on the prior interface screen (FIG. 4) and available for editing; a section for displaying a navigation arrow 135 for enabling the user to proceed back to the Detailed specification Workspace 23 of FIG. 5, and arrow 136 for returning to the initial Context Selection screen via the first iconic interface to initiate a new query or select a different user context; and, a Results Display Workspace 33 that enables the user to visualize and explore the response set that the system has found to best match the user's initial query and related subject and context variables and that enables the user to continue working to learn about the resources suggested (detail/preview), narrow their results (selection) or re-display them in a more meaningful view for decision making (graphically).

The Results Display Workspace 33 particularly includes a graphic element 333 which comprises a list of ranked resources 338 returned by the user's query. Via this graphic element, the user is provided with ability to select via checkboxes 348, for example, one or more resources for viewing of additional details. The response set 338 is ranked by the aggregate value and weighting defined by resource selection criteria and value ranges as described herein.

As shown in FIG. 7, the Results Display Workspace 33 displays the weighting 332 for each of the available resource selection criteria 339a, . . . , 339e. The choices of weighting and selection of resource selection criteria are made on the Detail Specification Workspace described generally herein with respect to FIG. 5. Preferably, the system generates for display in the Results Display Workspace 33 a multidimensional plot 335 comprising one or more axes, e.g., 331a, . . . , 331e, with each axis corresponding to each previously specified results selection criterion such as cost 339e, time 339a, timing 339b, quality 339d and risk 339c. The plot is initiated in response to user selection of graph icon 337, and the user's selection of one or more resources 338 from the displayed list 333 of ranked resources. Each axis 331a, ..., 331e is displayed in the sequence specified by the user in the detail specification workspace 23 and includes one or more data points 349 corresponding to each resource 348 selected from the list 333. Each data point represents the value of the particular resource selection criteria represented by the axis for that resource. As the user moves his/her mouse over a data point resource on one of the axes 331a, ..., 331e, for example, data point 330a on axis 331a in FIG. 7, the resource represented by that data point is visually connected, e.g., by line 334, to all the other points for that same resource, e.g., points 330b–330e. Additionally, in response to such showing, the values for all the resource selection criteria and name and rank of the resource 342 is displayed. It is understood that the locations of the data points 349 on each axis reside between the minimum and maximum resource selection criteria values indicated by the slider bars 252a, 252b as previously set by the user in the detailed specification workspace 23 of FIG. 5.

The interface 32 is additionally provisioned with an icon 346 selectable for initiating the display of a Resource Detail Display portion 336 shown in FIG. 7, which is a graphical element used to provide further details or previews of the resources 338 selected from the list of ranked resources 333. Besides providing a text description 329 of the resource, including name, cost, timing, and terms and conditions, the graphical element 336 may be provided with hyperlinks 351–353 enabling the user to read more details regarding the resource, see pictures of the resource, or preview the resource, respectively. It should be understood that icon 337 for viewing the graph or the icon 346 for viewing detailed descriptions of the actual resources are independently selectable.

As further shown in FIG. 7, the user has the additional option 347 to view a detailed description of a currently plotted resource highlighted or shown in the graphic portion 335. The detailed description of a currently plotted resource is displayed via the Resource Detail Display portion 336.

As the user works with the system, particularly through the Results Display Workspace 33 (FIG. 7) and the Detail Specification Workspace 22 (FIG. 5) his/her interactions are captured and stored in the User Interaction Records database 15. Thus, in addition to the user query, context vector and response data set, the system retains adjustments to user context, results display manipulation, and results viewing and selection behavior 51.

Having completed the transaction, there is one more sub-process which is essential to this system: the sub-process for Context Cluster Discovery and Validation 48. This batch process, occurring asynchronously and constantly, applies unsupervised (machine) learning to cluster user interaction records and to assist in the identification of new user contexts, attribute value functions and resource indexing functions. The User Interaction Records 19 are processed against the Context Attributes Master database 14, the Attribute Value Functions database 16 and the Resource Indexing Functions database 18 and a Distance Metric 44 which helps determine "how close is close", i.e., "what's good enough" for a variety of factors. When validated by a system administrator, additional user contexts may be implemented (manually or semi-automatically) in the databases and visibly as new icons on the Context Selection Workspace 13.

Attribute functions may also be identified and resource indexing functions may be discovered and updated in the appropriate files automatically. All of these additional classifications improve the ease of use, accuracy, and predictability of the system over time. Further details regarding the Context Cluster Discovery and Validation sub-process 48 may be found in commonly-owned, co-pending U.S. patent application Ser. No. 09/778,149 entitled CUSTOMER SELF SERVICE SUBSYSTEM FOR CONTEXT CLUSTER DISCOVERY AND VALIDATION, the contents and disclosure of which are incorporated by reference as if fully set forth herein.

The customer self-service system and the interaction with the system through the iconic interfaces of FIGS. 2, 4, 5 and 7, will now be described with respect to example domains such as education, travel and real estate, and further will be described from the point of view of the following users: a learner, a traveler and a real estate transactor, e.g., renter/buyer. In describing the user's interaction with the system through the iconic interfaces, a set of data elements used in the system and their characteristics are first defined as follows:

Query: an entry field for entering search data by using text or voice methods, for example, but not limited to these methods User Context: a User Context represents a predefined set of context attributes which are relevant to the search behavior/needs of a group of people.

More particularly, the User Context enables the packaging of a rich set of attributes about the user with a rich set of attributes about their searching and execution environment in response to "one click" of an icon for the user presented via the interface. While there are potentially a large number of potential user contexts for any user population, each individual user would likely settle on a small number that apply to them in different circumstances. The naming of these contexts is important so that the user may recognize him/herself as potentially fitting into that group. The attributes associated with a particular user context are pre-defined by system administration and cannot be modified by the user. Over time, by implementing the Classifying User Context sub-process 24 (FIG. 1), the system will identify changes to the attribute set that will make a particular user context perform better for its repeated users. Over time the system will detect different attribute sets which appear to predict user needs/behaviors and might suggest new user contexts for the system.

Context Attribute: An attribute is used to describe a characteristic associated with the User Context.

There are potentially an unlimited number of attributes defined to the system with a master list maintained in the Context Attributes Master File. New attributes are discovered and added with system administrator validation. End users may not modify the definition of a context attribute, nor its' packaging into user contexts, nor the list of values associated with each.

Attribute Value: A list of attribute value choices is pre-defined for each context attribute.

The system sets a default value to each attribute based upon data lookup, sensed, or historically derived from prior user entry or behavior. Either the system or the user may modify the value initially set based upon explicit preferences or observed behavior. This value is added to the context vector used for resource lookup, and is retained in the historical User Interaction Records database 15 so it may be used to set default values for each individual each time they use the system.

Value Resource Parameters: Parameters defined in terms of inclusion and exclusion that may be used as a filter to increase the relevance of the response set.

That is, with the basic search logic established, the user's query may be satisfied. However, the response set may contain a large number of resources which are not satisfactory to this individual. Value Resource Parameters defined in terms of inclusion and exclusion may be used as a filter to increase the relevance of the response set. The inclusionary parameters may be easier to establish by users new to the system and that exclusionary parameters will become more evident as users gain experience in working with the response sets.

Resource Selection Criteria and Value Ranges: Parameters and specifications for ranking a user's response set to enable more informed resource selection.

Thus, even with the degree of specificity enabled by the system, and even with the constant improvement in search relevance/efficiency as it relates to user contexts, there usually may be more than one resource to present to the user (in fact, if the search is too narrow, the user may miss the opportunity to explore/discover different approaches to meeting their actual needs). As most users know (or think they know) the criteria they will apply to selecting between options, a limited set of resource selection criteria are provided by the system (the set would differ by domain). However, via an interactive graphical display provided by the iconic interface of the invention, the user may now specify acceptable value ranges and relative weighting of each criteria for ranking their response set and/or may customize the use of these criteria.

When the actual response set data is offered, most users face the reality of many options, few options, more subjective information about specific resources; and they may make tradeoffs around the selection logic. For example, the response set may be refreshed as the user may decide to eliminate a criteria, change the weight of a criteria, or change the acceptable value ranges for a criteria. From these specifications, accessible via the iconic interface of the invention, the user may determine for example, whether time, timing, flexibility, and risk may be sacrificed in order to bring the cost down below a certain dollar ($) value, and, for example, determine how much more would the user need to pay to get exactly what he/she wants exactly when he/she wants it.

FIGS. 2, 4, 5 and 7 depict in greater detail the iconic interfaces for the customer self service system that enable the use of a rich set of assumed, sensed, inferred, and derived contexts with minimal user effort.

With initial logon, as shown in FIG. 2, the system first presents a set of user contexts which are available to the user via the simplified iconic interface 12 of FIG. 2. The system will suggest one context over the others, but the user may select the one most appropriate to their current situation. In each session, the user selects only one user context to use, however over time each user may discover that a couple of different user contexts serve their needs in differing circumstances. On this screen 13 particularly, the user then enters a query via one or more methods including text via a web browser display interface, for example, or via voice, for example, with help of voice recognition software. It should be understood however, that query entry is not limited to these types of methods. The user will then initiate a lookup and proceed either to a third process step (via most direct path 52) for viewing a search result response set via the Results Display Workspace interface 32, or, proceed to a second step (via path 50) to optionally refine/override search variables via the Detail Specification Workspace interface 22.

Figure 4:
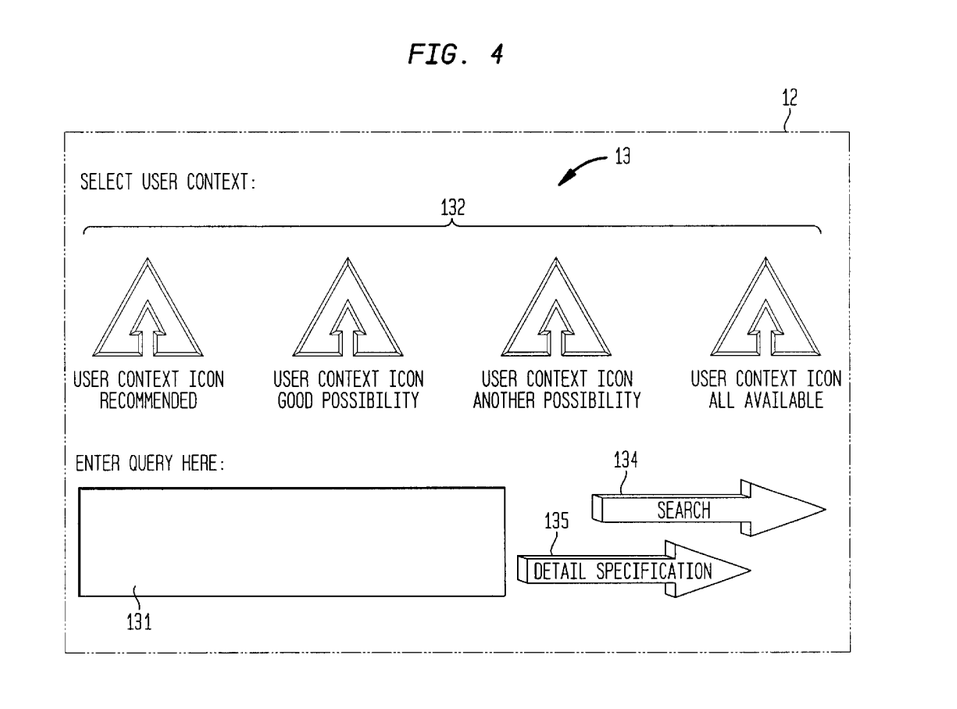
FIG. 4 illustrates the first iconic Graphical User Interface 12 including the Context Entry Workspace 13.

FIG. 4 illustrates in detail the first graphical user interface 12 including the initial Context Selection Workspace 13 that enables the expression of user context as part of a query. As shown in FIG. 4, the Context Selection Workspace 13 includes: a series of one or more selectable User Context Icons 132 presented to the user for selecting user contexts; and, a Query Entry Field 131 enabling user entry of search terms via text or voice entry, for example. In accordance with the principles of the invention, the User Context Icons 132 are graphical user interface elements from which the user selects the one context most representative of his/her current situation. The icons presented in this interface each represent a packaging of sets of attribute-value pairs which describe a kind of user in a particular situation. Particularly, a user context represents a predefined set of context attributes which are relevant to the search behavior/needs of a group of users. For example, as described herein, context may include aspects of the user's knowledge, their relationship to organizations and/or communities, their user environment(s), and their resource need. All of these combine to provide a rich context surrounding the actual query which can significantly improve the outcome of the search through resources.

The Context Selection Workspace 13 thus enables the expression of user context as part of the query and is optimized for ease of use. Particularly, the user selects from one or more of the several displayed context icons 132 by clicking on them. A context "applier" pre-process described in commonly-owned, co-pending U.S. patent application Ser. No. 09/778,378 is invoked at each session initiation for a user's search transaction, using a minimal or null user data set to produce defaults for user context, attributes, values, and resource parameters for the initial display of the Context Selection Workspace 13. This pre-processing step delivers additional benefits to the user by ensuring the use of the most current data and functions operating in the system. After making the initial query entry, by selecting hyperlink 134, the user is able to initiate the search and proceed directly to the third interface 32 which displays the actual search results. Alternately, by selecting hyperlink 135, the user may proceed to the second interface 22 having the Detail Specification Workspace 23 for further query editing and/or context refinement.

Returning to FIG. 2, with respect to the second step, the user is able to fine tune or override context attribute values, value resource parameters, and resource selection criteria and value ranges, using a drag and drop interface, iconic pulldowns, and/or slide buttons. The user may return to this screen as many times as needed to find a suitable response set. Particularly, via the second iconic interface 22, the User Context selected in the first step has been made explicit by its default settings on all the iconic interface elements listed. Thus, via a Detail Specification Workspace 23 the user may: 1) modify the query (via text entry or voice, for example); 2) change the value of attributes associated with the user context (using pull down menus); alter the value resource parameters (e.g., include/exclude) using checkboxes; 3) customize the subset of responses by altering the resource selection criteria, including the weighting of criteria and the ordering of criteria on the final display, (e.g., using checkbox and/or numeric entry); and, 4) further refine the selection by specifying minimum/maximum acceptable value ranges for resource selection criteria through drag and drop of "tabs" on sliders, for example. After making the necessary adjustment, the user re-initiates the lookup and may proceed to the third step via path 51.

Figure 5:
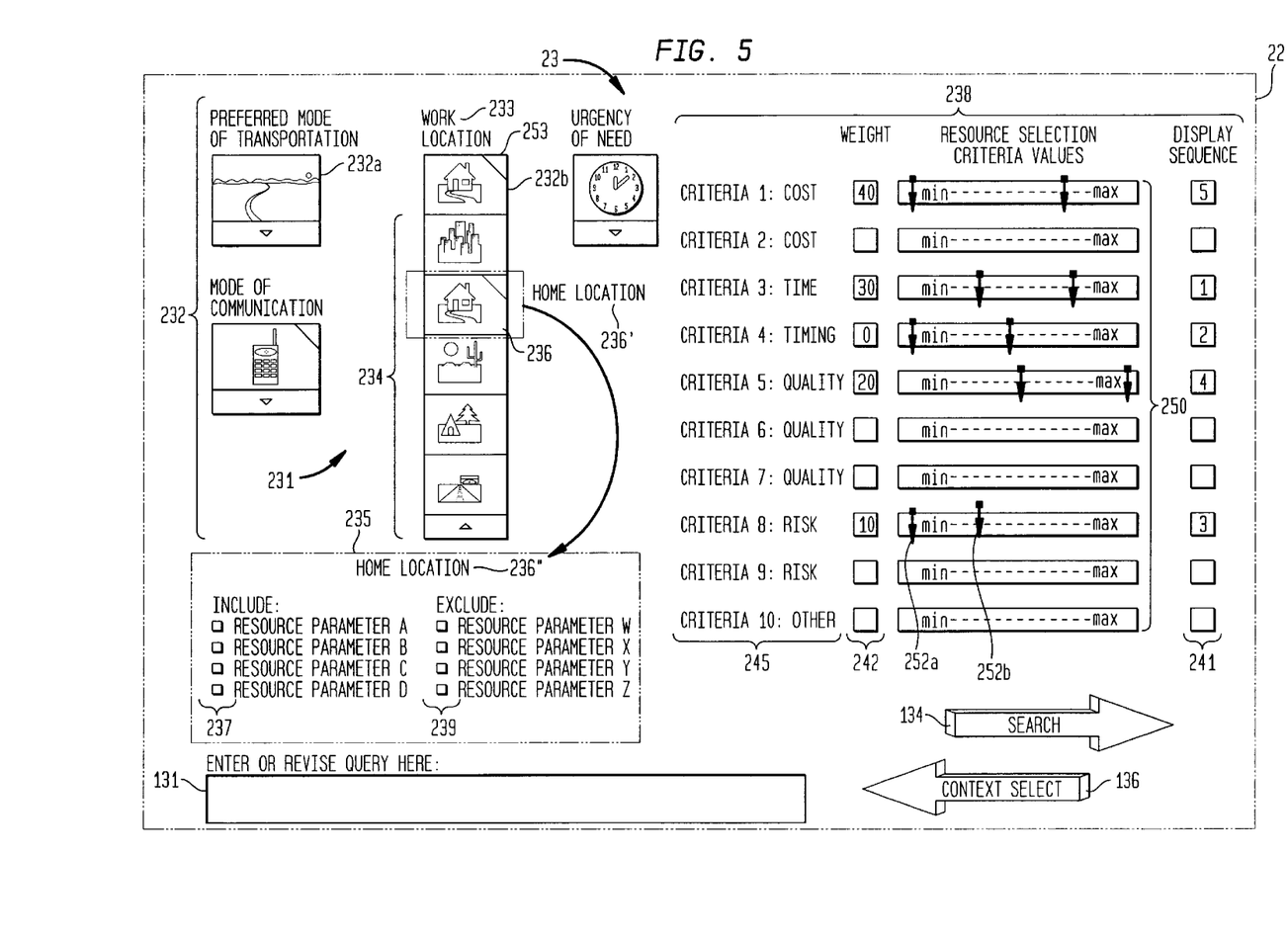
FIG. 5 illustrates the second iconic Graphical User Interface 22 including the Detail Specification Workspace 23.

FIG. 5 illustrates in detail aspects of the second iconic graphical user interface 22 which enables the user to define or change all the parameters associated with their query 131 and (single) selected user context 132. As shown in FIG. 5, the graphical user interface 22 is divided into the following sections: a section for displaying the Query Entry field 131 as entered on the prior interface screen (FIG. 4) and available for editing; a section for displaying navigation arrows which allow the user to proceed with the search 134, or return to the initial Context Selection screen 136 via the first iconic interface to initiate a new query or select a different user context; and, a Detailed Specification Workspace 23 which is where all the search parameters can be explicitly viewed and modified. There are only two things the user cannot change from this screen: the user context selected (which they may change only on the Context Selection screen) and the context attributes which are linked to the user context (and which are predefined in the Context Attributes Master database 14).

Figure 3:
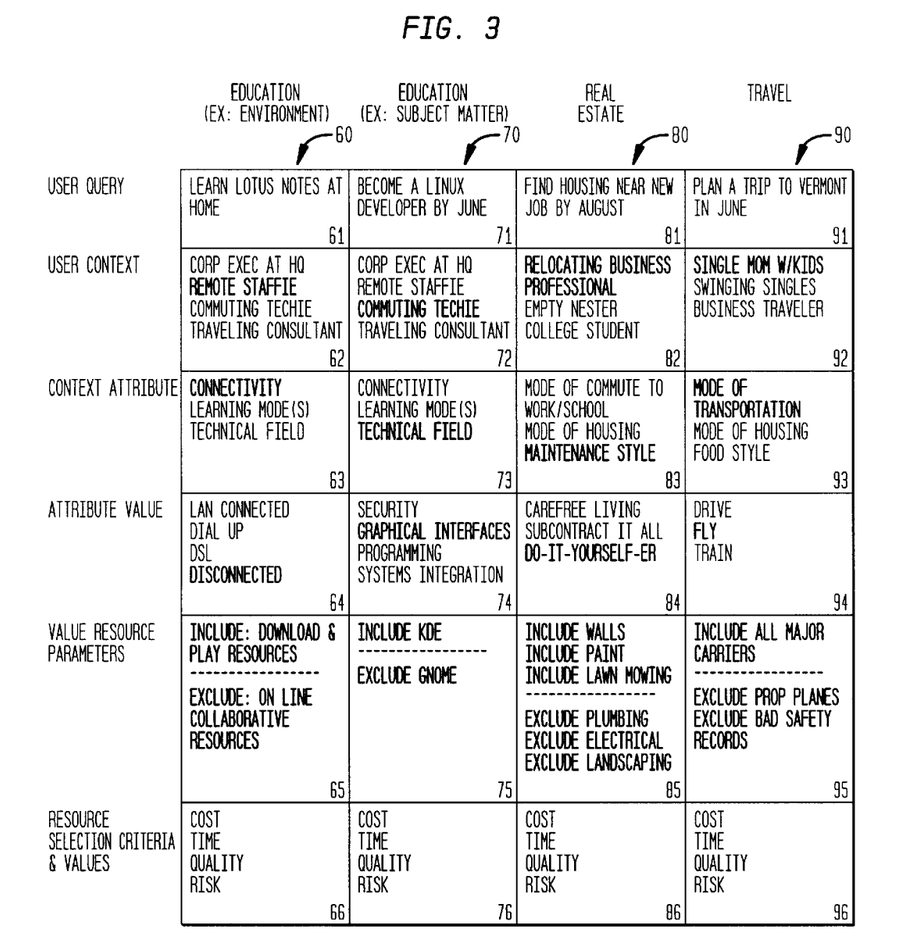
FIG. 3 provides examples of data elements from the education, real estate and travel domains given example user interactions with the customer self service system via the iconic interfaces.

As shown in FIG. 5, within the Detailed Specification Workspace 23 there comprises: an Attribute-Value Workspace 231, for enabling the user to change the attribute values for all the context attributes, represented as graphic elements 232, associated with the selected user context icon 132 (FIG. 4); and, a Resource Selection Criteria Workspace 238, for enabling the user to define the criteria 245 to be used in evaluating resources, define minimum and maximum acceptable values provided on slider elements 250 corresponding to each criteria, specify the weight assigned to those criteria via selection boxes 242, and specify the positioning of those criteria in a graphical display of the resources selected via selection boxes 241. As will be described, FIG. 3 provides sample data for the context attribute, attribute value, value resource parameters, and partial resource selection criteria from different domains which may be represented in the Detailed Specification Workspace 23.

With more particularity, the Detailed Specification Workspace 23 additionally includes the Value-Resource Parameter Workspace 235, for enabling the user to change or create resource parameters using include logic 237 or exclude logic 239 for any attribute value 232 selected in the Attribute-Value Workspace 231. More specifically, the Attribute-Value Workspace 231 includes graphical representations of all the context attributes 232 associated with the single (currently active) selected user context 132. Each context attribute 232 is displayed with a text title 233 for the attribute. The currently active attribute value for that context attribute is shown on each context attribute icon. In addition, if the user has substituted, as described below, a context attribute value different than the default value provided for this user session, a marker 253 is displayed on the corner of the context attribute icon. If the user "mouse clicks" on the context attribute element, e.g., icon 232b, the system displays a pull down menu 234 of graphic elements showing all the possible attribute values for this context attribute. If the user "mouses over" any of the values from pull down menu 234, e.g., attribute value 236, a textual description 236' supporting the element may appear. By selecting a context attribute element from the pull down menu 234, e.g., element 236 shown highlighted in FIG. 5, the user is enabled to fine tune their selected context based upon their current situation. If the user "mouse clicks" on a value other than the current default, the new value is "selected" to substitute for the default. If the user "double clicks" on the attribute value, the system prepares the Value-Resource Parameter Workspace 235 for this single attribute value, as will be described. FIG. 3 provides sample data for context attributes and attribute values from different domains which may be represented in the Attribute Value Workspace 231.

In the Value-Resource Parameter Workspace 235, the user may change or create resource parameters using include logic or exclude logic for any context attribute value 232 selected in the workspace 231. Regarding FIG. 5, with more particularity, the Value-Resource Parameter Workspace 235 is displayed for one attribute value at a time and is only displayed when requested via a double click, for example, on one of the attribute values displayed in the attribute Value Workspace 231, e.g., attribute value 236. The Value-Resource Parameter Workspace 235 is a pre-formatted two-column space (dialog box) where the user may establish inclusionary resource filters via checkboxes 237 and/or exclusionary resource filters via checkboxes 239, based upon pre-established resource characteristics 236" for that selected attribute value. The value resource parameter data elements are pre-set by the user's know context, prior history of selecting from resources identified by the system, and potentially by corporate/organizational policy implemented through the system. By making these additional specifications, the user is enabled to increase the relevance of the resource response set based upon their current situation and personal preferences. When finished with these specifications, the user may double click to close this box 235 and return to the Attribute Value Workspace 231. This step can be repeated for as many attribute values as the user would like to refine and may be executed either before or after the search is conducted. Value resource parameter data elements associated with context attribute values for different domains, are provided in FIG. 3 as samples of data which may be represented in this Value-Resource Parameter Workspace 235.

Regarding FIG. 5, with more particularity, the Resource Selection Criteria Workspace 238 includes a list of criteria 245 which may be used in evaluating resources. This list, provided by the system, is customized by domain; but in all domains, it involves criteria including, but not limited to issues such as: cost, time, timing, quality and risk associated with using a particular resource to satisfy the user's specific need. The initial system default might be to use all criteria and weight them equally. Over time, however, the default criteria may be set by the system based upon user context, user prior transaction history and user behavior on prior searches. If the user wishes to further reduce the set of criteria, they may do so by assigning a weight, for example a percentage weight, to each criteria they want used in the entry boxes 242. Along with each of the criteria selected there exists a range of acceptable values specified on an associated individual slider element 250. The initial system default, may be "unlimited" and then, may be set over time based upon user context, use and behavior. Additionally, the user may use drag and drop tabs 252a,b on the slider element 250 to set a minimum and/or maximum value for the associated resource selection criteria. It is understood that the unit of measure on the sliders may vary by criteria. Further, via entry boxes 241, the user may select to view via "check" or specify via number entry the display sequence of these criteria when arrayed as the axes on an n-dimensional graphic display provided in the Results Display Workspace via graphic interface 32 as described in commonly owned, co-pending U.S. patent application Ser. No. 09/778,147, or when viewed on another visualization system.

The Detailed Specification Workspace 23 thus provides full disclosure of system defaults and enables the user to completely manage their search.

With respect to the third step, a display of the annotated response set is provided in a form ready for preview or selection as described herein with respect to FIG. 7. The user may rework this screen as many times as needed to better understand and make decisions about resource(s) to use. More particularly, via the Results Display Workspace 33 the user may: 1) view the response set, ranked by the aggregate value and weighting as defined by resource selection criteria and value ranges; 2) select one or many of the ranked responses for graphical display in multi-dimensions along the multiple axes of the resource selection criteria; and, 3) initiate a "roll over" of one or more resources from either the ranked list or the graphical display to view detailed descriptions or to "preview" the resource. If there are too many responses, too few, or if they are incorrect, the user may return to the second step to further refine/redefine, and re-execute the lookup. Alternately, the user may return to the first step to choose a different context for their search.

While the system is intended to operate on a fully enabled graphic workstation or personal computer, it is intended that search definition and the results visualization processes described herein with respect to FIGS. 4, 5 and 7 may be operated by users of reduced graphics-enabled devices such as text screen workstations, Organizers, or any type of Personal Digital Assistants (PDAs). Accordingly, in alternative embodiments, all the context icons may have names, all the graphical displays may be reduced to lists, all the pull downs may be viewed as indented lists or secondary screens, and all the min-max sliders may convert to fill-in boxes. Further, as mentioned, the customer self service system described herein is applicable to many applications including the domains of education, real estate, and travel. The generic process flow described with respect to FIG. 2, will now be described with specific examples from the education, real estate and travel domains as shown in FIG. 3.

With respect to the education domain, the user is a learner and FIG. 3 depicts an example interaction with the system through the iconic interfaces (FIG. 2) included in the embodiment of the invention as applied to the education domain. The three iconic workspaces of FIG. 2 enable the learner to specify example data elements, such as the example data elements depicted in the Education (e.g., Environmental) column 60 of FIG. 3, and view results, as follows: In the first process step, the learner uses the Context Selection Workspace (interface 12 of FIG. 4) to specify their query 61 as "Learn Lotus Notes at home." The learner may select the User Context "Remote Staffle", for example (where the icon's name is highlighted in FIG. 3), from among the available set of context icons 62. The learner may then elect to go to the Detail Specification Workspace (interface 22 of FIG. 5) in the second process step in order to view the context attributes 63 associated with the "Remote Staffie" User Context. Preferably, the default assigned context attribute value ("DSL", for example) for any context attribute ("Connectivity", for example) is visible on the context attribute icon ("Connectivity", for example, whose name is shown highlighted in FIG. 3). The learner may click on the context attribute "Connectivity" to see the menu of associated attribute values 64. The learner, for example, may select the "Disconnected" attribute value shown highlighted in FIG. 3. By double clicking on this attribute value the list of Value Resource Parameters, i.e., include/exclude filters 65, for the attribute value "Disconnected" is displayed. The learner, for example, may indicate that they want to include download and play resources and exclude online collaborative resources when searching for relevant resources. The learner may additionally specify resource priorities 66 by selecting, sequencing and weighting and specifying minimum and maximum values for relevant criteria such as cost, time, quality and risk on the Resource Selection Criteria Definition graphical user interface element on the Detail Specification Workspace (interface 22 of FIG. 5). In the third step of the process, the results of the learner's search are listed in the user view of the Results Display Workspace (interface 32 of FIG. 2). The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace to redefine their query or select a different User Context such as "Commuting Techie" via the first interface. The learner may additionally elect to return to the Detail Specification Workspace of the second interface to change the default value of the context attribute "Connectivity" from Disconnected to Dial-up and add or remove Value Resource Parameters for the attribute value Dial-up or other context attribute values associated with context attributes such as "Learning Mode" or "Technical Field". The learner may also change their selection criteria, the weighting of the selection criteria, and the minimum/maximum values for any selection criteria, in hopes of identifying additional relevant resources.

With respect to the education domain, the user is a "learner" however, the three iconic workspaces of FIG. 2 provide the process for enabling the learner to specify example data elements, such as the example data elements depicted in the Education (e.g., Subject Matter) column 70 of FIG. 3, and view results, as follows: In the first process step, the learner uses the Context Selection Workspace (interface 12 of FIG. 4) to specify their query 71 as "Become a Linux developer by June" for example. The learner selects the User Context "Commuting Techie" from among the available context icons 72. The learner may elect to go to the Detail Specification Workspace in order to view the context attributes 73 associated with the "Commuting Techie" user context. Preferably, the default assigned context attribute value ("Programming", for example) for any context attribute ("Technical Field", for example) is visible on the context attribute icon ("Technical Field", for example, whose name is shown highlighted in FIG. 3). In addition, the learner may click on the context attribute ("Technical Field, to stay with the example) to display a pull down menu to view the other values 74 (in either picture or word format) that could be assigned to this attribute. The learner, for example, may select "Graphical Interfaces" shown highlighted in FIG. 3. By double clicking on this attribute value, the list of Value Resource Parameters (include/exclude filters 75) for the attribute value "Graphical Interfaces" will be displayed. For example, the learner may indicate that they want to include the KDE interface and exclude the GNOME interface when searching for relevant resources. The learner may additionally specify resource priorities 76 by selecting, sequencing and weighting and specifying minimum and maximum values for relevant criteria such as cost, time, quality and risk on the Resource Selection Criteria Definition graphical user interface element on the Detail Specification Workspace. The results of the learner's search are listed on the Results Display Workspace via the interface 32. The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace 13 via the first interface 12 to redefine their query or select a different user context such as "Traveling Consultant." The learner may also elect to return to the Detail Specification Workspace via the second interface 22 to change the default value of the context attribute "Technical Field" from Graphical Interfaces to Programming and add or remove Value Resource Parameters for the attribute value Programming or other context attribute values associated with context attributes such as "Learning Mode" or "Connectivity." The learner may also change their selection criteria, the weighting of the selection criteria, and the minimum/maximum values for any selection criteria, in hopes of identifying additional relevant resources.

With respect to the real-estate domain, the user is a real estate transactor (renter/buyer) and FIG. 3 depicts an example interaction with the system through the iconic interfaces (FIG. 2) included in the embodiment of the invention as applied to the real estate domain. The three iconic workspaces of FIG. 2 enable a real estate renter or buyer to specify example data elements, such as the example data elements depicted in the Real Estate column 80 of FIG. 3, and view results, as follows: In the first process step, the renter or buyer uses the Context Selection Workspace to specify their query 81 as "Find housing near new job by August." The renter or buyer selects the user context "Relocating Business Professional" from among the available context icons 82. The renter or buyer may elect to go to the Detail Specification Workspace in the second interface in order to view the context attributes 83 associated with the "Relocating Business Professional" user context. Preferably, the default assigned context attribute value ("Subcontract it all", for example) for any context attribute ("Maintenance Style", for example) is visible on the context attribute icon ("Maintenance Style", for example, whose name is shown highlighted in FIG. 3). In addition, the renter/buyer may click on the context attribute ("maintenance style, to stay with the example) to display a pull down menu to view the other values 84 (in either picture or word format) that could be assigned to this attribute. Upon renter or buyer double clicking on attribute value "Do-It-YourSelf-er", for example, the list of Value Resource Parameters (include/exclude filters 85) for the attribute value "Do-It-YourSelf-er" is displayed. For example, as shown in FIG. 3, the renter or buyer may indicate that they want to include walls, paint and lawn mowing and exclude plumbing, electrical and landscaping when searching for relevant resources. The renter or buyer may additionally specify resource priorities 86 by selecting, sequencing and weighting and specifying minimum and maximum values for relevant criteria such as cost, time, quality and risk on the Resource Selection Criteria Definition graphical user interface element on the Detail Specification Workspace. The results of the renter or buyer's search are listed on the Results Display Workspace of the third interface 32 in which the renter or buyer may immediately select one or more of the listed real estate resources, request to see additional details on them, or request to see a response set graphic indicating the relative positioning of each resource along each of the axes (n-dimensions, relating to cost, time, quality and risk) specified earlier. If no acceptable housing resources were provided, the renter or buyer may return to the Context Selection Workspace to redefine their query or select a different user context such as "Empty Nester." The renter or buyer can also elect to return to the Detail Specification Workspace to change the default value of the context attribute "Maintenance Style" from Do-It-Yourself-er to Subcontract It All, for example, and add or remove Value Resource Parameters for the attribute value "Subcontract It All" or other context attribute values associated with context attributes such as "Mode of Commute to Work/School" or "Mode of Housing." The real estate transactor may also change their selection criteria, the weighting of the selection criteria, and the minimum/maximum values for any selection criteria, in hopes of identifying additional relevant resources.

With respect to the travel domain, the user is a traveler and FIG. 3 depicts an example interaction with the customer self service system through the iconic interfaces (FIG. 2) included in the embodiment of the invention as applied to the travel domain. The three iconic workspaces of FIG. 2 enable a traveler to specify data elements, such as the example data elements depicted in the Travel column 90 of FIG. 3, and view results, as follows: In the first process step, the traveler uses the Context Selection Workspace to specify their query 91 such as "Plan a trip to Vermont in June", for example. The traveler may then select the User Context Icon "Single Mom with kids", for example, from among the available user context icons 132, (where the icon's name 92 is highlighted in FIG. 3). The traveler may then elect to go to the Detail Specification Workspace in order to view the context attributes 93 associated with the "Single Mom with Kids" user context.

Preferably, the default assigned context attribute value ("Drive", for example) for any context attribute ("Mode of Transportation", for example) is visible on the context attribute icon ("Mode of Transportation", for example, whose name is shown highlighted in FIG. 3). In addition, the traveler may click on the context attribute ("mode of transportation ", to stay with the example) to display a pull down menu to view the other values 94 (in either picture or word format) that could be assigned to this attribute ("Fly" for example). The traveler selects "fly" as an alternative to "drive", as illustrated with highlighting in FIG. 3. By "overriding " this attribute value and double clicking on it, the list of Value Resource parameters (include/exclude filters 95) for the attribute value "Fly" is displayed. The traveler may indicate that he/she wants to include all major carriers and exclude prop planes and airlines with bad safety records when searching for relevant resources. The traveler may also specify resource priorities 96 by selecting, sequencing and weighting and specifying minimum and maximum values for relevant criteria such as cost, time, quality and risk on the Resource Selection Criteria Definition graphical user interface element on the Detail Specification Workspace. The results of the traveler's search are then displayed via the Results Display Workspace of the third iconic interface 32 of FIG. 2. The traveler may immediately select one or more of the listed travel resources, request to see additional details on them, or request to see a response set graphic indicating the relative positioning of each resource along each of the axes (n-dimensions, relating to cost, time, quality and risk) specified earlier. If no acceptable travel resources were provided, the traveler may return to the Context Selection Workspace in Step 1 to redefine their query or select a different user context such as "Swinging Singles." The traveler may also elect to return to the Detail Specification Workspace in Step 2 to change the default value of the context attribute "Mode of Transportation" from Fly to Train and add or remove Value Resource Parameters for the attribute value Train or other context attribute values associated with context attributes such as "Mode of Housing" or "Food Style". The traveler may also change their selection criteria, the weighting of the selection criteria, and the minimum/maximum values for any selection criteria, in hopes of identifying additional relevant resources.

Referring back to FIG. 1, the customer self service system implements an n-dimensional context vector 25', derived from the combination of user context and previous interaction with the system, to map specific contexts to specific resources. This increases the relevance of search results for a given user in their current context without requiring the user to explicitly train the system. Inferences and conclusions are made regarding both the individual user's preferred resource characteristics and those of a common set of users. These are used as input to the sub-processes of the invention described herein and in sub-systems described in above-mentioned commonly-owned, co-pending U.S. patent application Ser. Nos. 09/778,378, 09/778,135 and, to modify the ionic interfaces presented to each particular user for their subsequent search using the current invention as well as to modify the results that would be selected for presentation to the user via the interface described in Ser. No. 09/778,147 in response to an identical search. Over time, the system will improve in its ability to serve individual needs and evolve to an ability to suggest preferred answers to groups of users.

The overall system also uses a batch background process described in commonly-owned, co-pending U.S. patent application Ser. No. 09/778,149 to cluster user interaction records to assist in the identification of new user contexts which serves to improve the system over time.

While the prior art has made use of adaptive learning in information retrieval systems, the overall customer self service system for resource search and selection enables the use of a large, rich set of contextual attribute-value pairs, is focused on learning about the user/user groups rather than the resources/resource groups and is able to discover user group characteristics and apply them to individuals. Much of the prior art is focused on the discovery of database structure, the clustering of data within the resources, or discovering relevant taxonomy for resources but the current system discovers contexts and context attributes among users which can be used predictively. The customer self-service system of the invention uses a highly specialized and optimized combination of supervised & unsupervised logic along with both automated and semi-automated entry of learned results and is able to deliver higher value because contexts are used in a closed loop self improvement system; front end (entry) middle (search and display) and back end (results and user feedback) are integrated. Other systems apply machine learning at the front, middle, or back, but not integrated throughout. The current system identifies context classifications and functions, and applies them to individual users to reduce the burden of fully communicating their question and increasing the specificity and accuracy of a query's search parameters. The current system identifies and improves selection logic and identifies and improves response sets to common queries based upon a rich set of contextual variables. The current system additionally orders the response set, potentially further limiting it, and prepares the response set for display in a way that identifies the "best" resources for a particular user based upon the rich set of context variables. The display of the invention additionally illustrates the decision making characteristics of the alternatives presented.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described my invention, what I claim as new, and desire to secure by Letters Patent is:

1. A resource results annotator for a customer self service system that performs resource search and selection comprising:
   mechanism for receiving a resource response set of results obtained in response to a current user query;
   mechanism for receiving a user context vector associated with said current user query, said user context vector comprising data associating an interaction state with said user and including context that is a function of the user; and,
   an ordering and annotation function for mapping the user context vector with the resource response set to generate an annotated response set having one or more annotations for controlling the presentation of the resources to the user, wherein the ordering and annotation function is executed interactively at the time of each user query.

2. The resource results annotator as claimed in claim 1, wherein said annotations include elements for ordering resource results to be displayed via a graphical user interface.

3. The resource results annotator as claimed in claim 1, wherein said annotations include elements for bolding one or more resource results to be displayed via a graphical user interface.

4. The resource results annotator as claimed in claim 1, wherein said annotations include elements for determining one or more primary resource results to be displayed on a first display screen via a graphical user interface and which are secondary resource results for presentation via a secondary display screen.

5. The resource results annotator as claimed in claim 1, wherein said self service system includes a database of user interaction records including actual resources selected by the users and the annotation schemes used for presenting them via a graphical interface, said annotator further comprising a processing mechanism for receiving user interaction data from among said database of user interaction records and an annotation scoring metric representing a measure of performance in locating resource response results displayed via said graphical interface, and, generating said ordering and annotation function, said annotation function being adaptable based on history of user interactions as provided in said database of user interaction records.

6. The resource results annotator as claimed in claim 1, wherein said processing mechanism for generating said ordering and annotation function is performed off-line.

7. The resource results annotator as claimed in claim 5, wherein said user interaction data comprises past and present user queries.

8. The resource results annotator as claimed in claim 5, wherein said user interaction data comprises system responses to said user queries.

9. The resource results annotator as claimed in claim 5, wherein said user interaction data comprises raw context information including: one or more of static, historical context, transient context, organizational context, community context, and environment context.

10. The resource results annotator as claimed in claim 9, wherein said user interaction data comprises other raw context associated with the user and dependent upon that user's interaction state and query domain.

11. The resource results annotator as claimed in claim 10, wherein a query domain includes one of: education, travel and real estate.

12. The resource results annotator as claimed in claim 5, wherein said processing mechanism implements a supervised learning algorithm.

13. The resource results annotator as claimed in claim 12, wherein said user interaction data comprises user interaction feedback, said supervised learning algorithm optimizing said annotation scoring metric as measured by said user interaction feedback.

14. A method for annotating resource results obtained in a customer self service system that performs resource search and selection, said method comprising the steps of:
   a) receiving a resource response set of results obtained in response to a current user query;
   b) receiving a user context vector associated with said current user query, said user context vector comprising data associating an interaction state with said user and including context that is a function of the user;
   c) applying an ordering and annotation function for mapping the user context vector with the resource response set to generate an annotated response set having one or more annotations; and,
   d) controlling the presentation of the resource response set to the user according to said annotations, wherein the ordering and annotation function is executed interactively at the time of each user query.

15. The method as claimed in claim 14, wherein said controlling step d) further includes the step of bolding one or more resource results to be displayed via a graphical user interface.

16. The method as claimed in claim 14, wherein said controlling step d) further includes the step of determining one or more primary resource results to be displayed on a first display screen via a graphical user interface and which are secondary resource results for presentation via a secondary display screen.

17. The method as claimed in claim 14, wherein said self service system includes a database of user interaction records including actual resources selected by the users and the annotation schemes used for presenting them via a graphical interface, said method further comprising the steps of:
   receiving user interaction data from among said database of user interaction records and an annotation scoring metric representing a measure of performance in locating resource response results displayed via said graphical interface; and,
   generating said ordering and annotation function, said annotation function being adaptable based on history of user interactions as provided in said database of user interaction records.

18. The method as claimed in claim 17, wherein said step of generating said ordering and annotation function is performed off-line.

19. The method as claimed in claim 17, further including implementing a supervised learning algorithm for generating said ordering and annotation function.

20. The method as claimed in claim 18, wherein said user interaction data comprises user interaction feedback, said supervised learning algorithm optimizing said annotation scoring metric as measured by said user interaction feedback.

21. A program storage device readable by machine, tangibly embodying a program of instructions executable by the machine to perform method steps for annotating resource results obtained in a customer self service system that performs resource search and selection, said method comprising the steps of:
   a) receiving a resource response set of results obtained in response to a current user query;
   b) receiving a user context vector associated with said current user query, said user context vector comprising data associating an interaction state with said user and including context tat is a function of the user;
   c) applying an ordering and annotation function for mapping the user context vector with the resource response set to generate an annotated response set having one or more annotations; and,
   d) controlling the presentation of the resource response set to the user according to said annotations, wherein the ordering and annotation function is executed interactively at the time of each user query.

22. The program storage device readable by machine as claimed in claim 21, wherein said controlling step d) further includes the step of ordering resources results to be displayed via a graphical user interface.

23. The program storage device readable by machine as claimed in claim 21, wherein said controlling step d) further includes the step of bolding one or more resources results to be displayed via a graphical user interface.

24. The program storage device readable by machine as claimed in claim 21, wherein said controlling step d) further includes the step of determining one or more primary resource results to be displayed on a first display screen via a graphical user interface and which are secondary resource results for presentation via a secondary display screen.

25. The program storage device readable by machine as claimed in claim 21, wherein said self service system includes a database of user interaction records including actual resources selected by the users and the annotation schemes used for presenting them via a graphical interface, said method further comprising the steps of:
   receiving user interaction data from among said database of user interaction records and an annotation scoring metric representing a measure of performance in locating resource response results displayed via said graphical interface; and,
   generating said ordering arid annotation function, said annotation function being adaptable based on history of user interactions as provided in said database of user interaction records.

26. The program storage device readable by machine as claimed in claim 21, wherein said step of generating said ordering and annotation function is performed off-line.

27. The program storage device readable by machine as claimed in claim 25, further including implementing a supervised learning algorithm for generating said ordering and annotation function.

28. The method as claimed in claim 26, wherein said user interaction data comprises user interaction feedback, said supervised learning algorithm optimizing said annotation scoring metric as measured by said user interaction feedback.

* * * * *